Jan. 26, 1937.  M. CAHN  2,068,843
DIVIDED ROLLER BEARING
Filed July 6, 1935
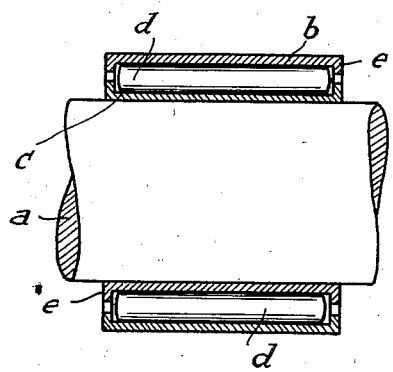
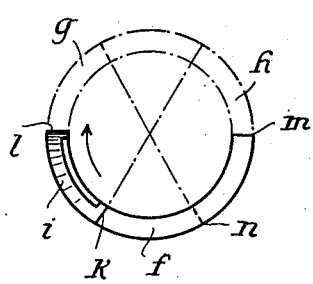
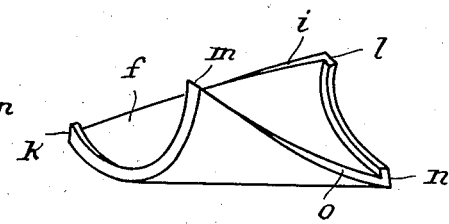
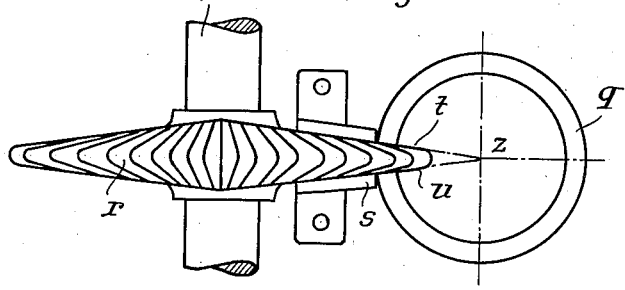
INVENTOR:
Max Cahn
his Attorney Patented Jan. 26, 1937

2,068,843

UNITED STATES PATENT OFFICE 2,068,843

DIVIDED ROLLER BEARING

Max Cahn, Cologne, Germany

Application July 6, 1935, Serial No. 30,061
In Germany November 24, 1933

4 Claims. (Cl. 308—216)

This invention relates to bearings, more particularly to ball or roller bearings having divided races.

It is an object of my invention to provide a new type or divided ball or roller bearing, which is free from certain inconveniences of similar bearings heretofore suggested.

Another object is an arrangement for, and a method of, producing such bearings and/or certain of their component parts in a simple and efficient manner.

Still another object will appear in the following description.

It has repeatedly been considered to divide the races of ball or roller bearings so that the bearings can be fitted to shafts or journals the shape or position of which prohibits the use of undivided bearings. One suggestion was to divide the races of the bearing by zig-zag cuts. Another suggestion was to divide the races by cylindrical cuts, the abutting faces of the components thus obtained forming parts of cylinders having an axis oblique to that of the bearing.

None of these suggestions have been adopted in practice because the following requirements seem to be indispensable with really useful divided ball or roller bearings:

1. The abutting surfaces of the cuts must be of a shape permitting these surfaces to be milled, ground or otherwise finished to a very high degree of accuracy.

2. The angle between the abutting surfaces and the running surfaces of the races must be constant and approximately 90°.

3. The shape of the cuts must permit the bearing to be assembled around a shaft by movements in parallel to the shaft.

It is obvious that these requirements cannot be complied with by cuts of a zig-zag shape or by cylindrically curved abutting surfaces. In accordance with my present invention I have, however, been able to ascertain that these conditions can be fulfilled in an effective and convenient manner by dividing the races of a ball or roller bearing by cuts according to helical surfaces, the generatrix of such helix or helices being for instance a straight line in the plane of and at a right angle to the axis of the bearing.

With races divided according to a helical surface of a finite pitch the rollers will cross the joint of two abutting components of the races at an angle, thus avoiding undue strains and safe-guarding a smooth running.

Furthermore, dividing surfaces of this type can be milled and finished to a high degree of accuracy in a very simple and inexpensive manner, as will be described in detail further below.

A roller bearing made in accordance with my present invention and a milling arrangement for milling the components of the races thereof are shown, by way of example only, in the accompanying drawing.

Fig. 1 is a cross section through a divided roller bearing,

Figs. 2 and 3 are an end view and a perspective view, respectively, of one component of the outer race of the bearing shown in Fig. 1.

Fig. 4 shows diagrammatically a milling arrangement for producing the component parts of the races.

In Fig. 1 the shaft $a$ to which the divided bearing $b$, $c$, $d$, $e$ is attached may be imagined to be a portion between two cranks of a multiple crank shaft. The cylindrical rollers $d$ are arranged between an inner race $c$ and an outer race $b$, the races having end shoulders $e$.

The races are divided by helical cuts into pluralities of portions which are more fully shown in Figs. 2 and 3.

The races are divided by helical cuts into three portions each, these portions being denominated $f$, $g$, $h$ in Fig. 2. The front surface of the portion $f$, which is shown in full lines reaches from $m$ to $k$ and corresponds to an arc of 120°, according to the division of the race into three portions. The helical surface $i$ reaches from $k$ to $l$. A corresponding helical surface $o$ (Fig. 3) is not visible in Fig. 2.

The pitch of the helix, i. e. the arc between the points $k$ and $l$ or $m$ and $n$ in Fig. 2 may be chosen at liberty within a considerable range, but I have found it particularly advantageous to choose the pitch so that the arc between the points $m$ and $l$ in Fig. 2 becomes 180°, or nearly so. In such a case the rollers will cross the lines of joint between abutting components of the races at a comparatively steep angle, but the components remain easy to be assembled on a shaft, as the extreme points of each of them are not wider apart than 180°.

In certain cases it is advantageous to have the races of the bearing according to my invention divided into more than three components each. I may for instance divide a race not into three portions as assumed in Figs. 2 and 3, but into four, six or even more portions. In such cases it is advantageous to increase the pitch of the dividing helix accordingly, so that the extreme ends of each portion again correspond to an arc of about 180°. The races thus remain easy to be assembled around a shaft in situ, but the rollers will cross the lines of joint at still steeper angles, with attendant further reduction of strain and wear.

It will be noted by those skilled in the art that the advantages due to the helical division of the races of my new bearings are not strictly dependent on the generatrix of the helix being a straight line in the plane of and at a right angle to the axis of the bearing. Similar generatrices lead to comparable results if properly chosen, but in order that the abutting surfaces should fit to each other perfectly the generatrices of the different cuts dividing one race, should be all of the same position relative to the axis of the bearing. Also, the pitch and the sense of rotation should be the same.

According to a further development of my present invention I produce the component parts of races divided by helical cuts of the first type mentioned above in the manner indicated in Fig. 4. An undivided race $q$, or a cylindrical tube of a corresponding diameter, is slotted by means of a conical end mill cutter $r$ mounted on a shaft $v$. While being slotted the race $q$ is fed axially and simultaneously rotated so as to produce the desired helical movement.

Experience has shown that closely fitting abutting surfaces are obtained in this manner only if the lines $t$, $u$ (the projections of the outline of the mill cutter) meet in the axis $z$ of the race or tube $q$. If they would meet beyond this axis, the joint between two abutting portions of the divided and re-assembled race would gap on the inside, and if the lines $t$ and $u$ would meet in front of the axis $z$, the joint would gap on the outside of the race. Such undesirable results may, however, easily and safely be avoided by means of an adjustable stop $s$, against which the race $q$ is urged during the milling operation, and the proper position of which is defined by the angle between the cutting surfaces of the end mill cutter $r$, the position of the shaft $v$ and the diameter of the tube or race $q$. One race $q$ yields two portions of a race composed of three portions, the rest of the tube being lost. Thus two tubes are required in producing three such races. In producing races composed of a higher number of components, the percentage of waste is reduced accordingly.

In the claims attached to this specification, wherever I refer to "rollers" or "roller bearings", I wish it to be understood, that I use this term in a general sense to designate not only cylindrical rollers, but rollers of any type including conical or spherical rolling elements of a bearing.

I claim:

1. A roller bearing comprising an outer and an inner race member, each of said race members being composed of at least three detachable components having helical abutting surfaces to abut against each other, said helical abutting surfaces being of such a pitch, that diametrical opposite ends of each component embrace an arc, which does not exceed 180°.

2. A roller bearing comprising an outer and an inner race member, at least one of said race members being composed of at least three detachable components having helical abutting surfaces to abut against each other, said helical abutting surfaces being of such a pitch, that diametrical opposite ends of each component embrace an arc, which does not exceed 180°.

3. A roller bearing comprising an outer and an inner race member, each of said race members being composed of at least three detachable components having helical abutting surfaces to abut against each other, said helical abutting surfaces being formed by a generatrix, which is a straight line in the plane of and at a right angle to the axis of the bearing, and being of such a pitch, that diametrical opposite ends of each component embrace an arc, which does not exceed 180°.

4. A roller bearing comprising an outer and an inner race member, at least one of said race members being composed of at least three detachable components having helical abutting surfaces to abut against each other, said helical abutting surfaces being formed by a generatrix, which is a straight line in the plane of and at a right angle to the axle of the bearing, and being of such a pitch, that diametrical opposite ends of each component embrace an arc, which does not exceed 180°.

MAX CAHN.